Oct. 31, 1950    A. C. KORTE    2,527,827
FUEL PUMP MOUNTING
Filed Nov. 28, 1947

INVENTOR.
ALFRED C. KORTE
BY
George R. Ericson
ATTORNEY

Patented Oct. 31, 1950

2,527,827

UNITED STATES PATENT OFFICE 2,527,827

FUEL PUMP MOUNTING

Alfred C. Korte, St. Louis, Mo., assignor to Carter Carburetor Corporation, St. Louis, Mo., a corporation of Delaware Application November 28, 1947, Serial No. 788,386

5 Claims. (Cl. 248—2)

This invention relates to means for mounting an accessory such as a fuel pump and, particularly, an electric fuel pump upon the cylindrical or transversely curved wall of a fuel tank or other support.

In my Patent No. 2,424,469 there is illustrated a mounting cradle for conveniently and stably mounting an electric fuel pump upon the flat bottom of a fuel tank. However, this mounting cradle is not adapted for attachment to the cylindrical walls of tanks, such as safety tanks frequently used with trailer tractors. Accordingly, it is the principal object of the present invention to provide means for securely attaching an electric fuel pump to a transversely curved tank wall, especially, for attaching a pump mounting cradle, as in the above mentioned patent, to such a wall.

This object and other more detailed objects hereafter appearing are obtained by the device illustrated in the accompanying drawing in which.

Figure 1:
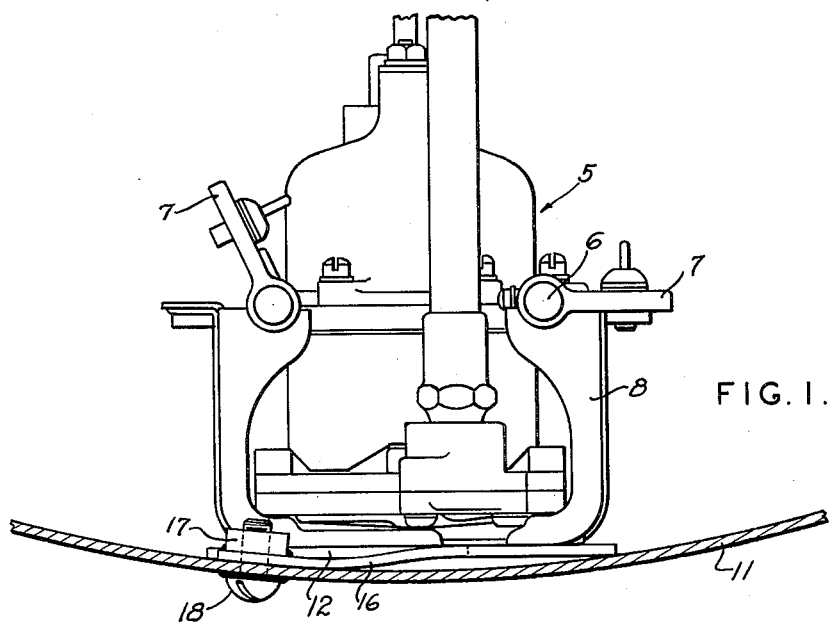
Fig. 1 is a partial vertical section through a fuel tank bottom wall and illustrating an electric fuel pump and its mounting cradle attached thereto.
Figure 2:
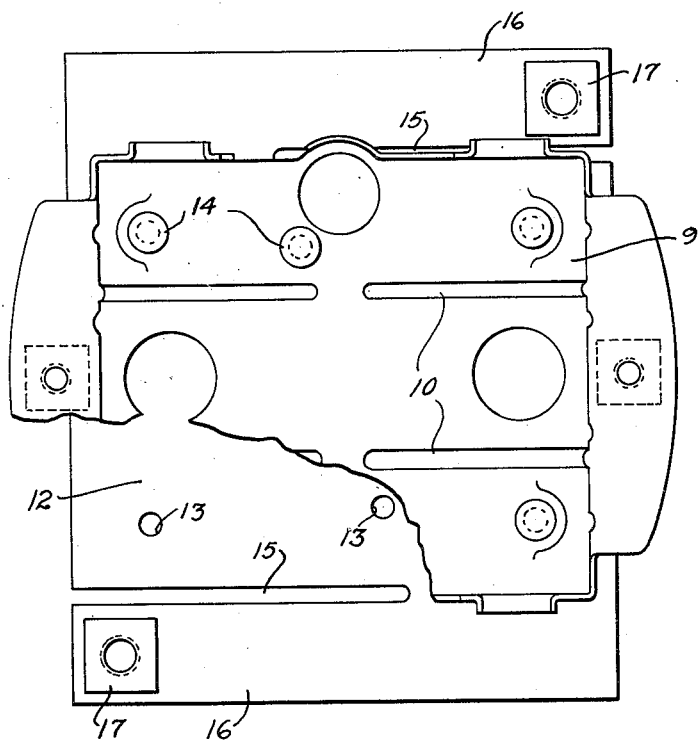
Fig. 2 is a top view of the cradle and attaching plate, parts being broken away for clearer illustration.

Figure 1 illustrates an electric fuel pump 5 of the type covered in my Patent No. 2,394,860 and shown here in elevation only. The pump has corner trunnions 6 of synthetic rubber and pivotable handle wings 7 by means of which it is supported on and anchored to cradle 8, all as described in the above mentioned Patent No. 2,424,469. Bottom plate 9 of the cradle is flat and provided with reinforcing ribs 10.

In order to attach this cradle to the curved bottom wall 11 of the fuel tank, there is provided a metal plate having a flat intermediate portion 12 which conforms with the under surface of cradle bottom plate 9 and is provided with holes 13 for rivets 14 attaching the plate to the bottom of the cradle. This attachment is effected before the pump and cradle are inserted within the tank. At the sides of intermediate portion 12, the plate is slotted, as at 15, to form diametrically opposite edge tangs 16. A nut 17 is welded to the extremity of each tang and the tang is perforated in registry with the nut opening.

When the assembled pump cradle and plate are inserted into the tank and the plate is rested against the curved inner surface of the fuel tank, screws or bolts 18 are inserted through suitable holes in the tank wall and into nuts 17. By means of these bolts, the nuts are drawn downwardly against the tank wall, causing deformance of tangs 16, as shown in Fig. 1. When the plate is thus securely attached and bolts 18 fully tightened, the bolt heads are welded to the tank sheet to seal the bolt openings.

Tangs 16 may be otherwise disposed so as to conform with the tank wall when drawn down by the bolts. The invention may be modified in this and other respects as will occur to those skilled in the art without departing from the spirit of the invention and the exclusive use of all modifications as come within the scope of the appended claims is contemplated.

I claim:

1. A support for mounting an accessory on a curved wall, comprising a cradle having a flat bottom and outstanding structure for receiving the accessory, and a plate having a flat intermediate portion secured to said cradle bottom and providing laterally projecting tangs for attachment to the curved wall, each of said tangs being readily deformable in its free end portion, into conformance with the curved wall.

2. A support as described in claim 1 further including means for attaching said tangs to and deforming the free ends thereof in conformance with the curved wall.

3. A support as described in claim 1 in which said tangs are formed by slots in said plate at the side of said flat, intermediate portion.

4. A support as described in claim 1 in which said tangs are provided with thickened, tapped portions near the free ends thereof for accommodating bolts received through the curved wall.

5. A support for mounting an accessory such as a fuel pump on the curved wall of a fuel tank, the support comprising an accessory-receiving cradle, a flat plate secured to the cradle and being slotted inwardly adjacent opposite edges thereof, to form relatively oppositely directed tangs, the free end portion of each tang being readily deformable into seating conformance with the curved wall of the fuel tank, and means for deforming said tang end portion into seating engagement with the curved wall of the fuel tank and securing the same to the wall.

ALFRED C. KORTE.

REFERENCES CITED

The following references are of record in the file of this patent:

UNITED STATES PATENTS

| Number | Name | Date |
|---|---|---|
| 431,603 | MacKensie-Hughes | July 8, 1890 |
| 1,272,919 | Crawford | July 16, 1918 |
| 1,600,816 | Harbert | Sept. 21, 1926 |
| 1,901,474 | Rodgers | Mar. 14, 1933 |
| 2,424,469 | Korte | July 22, 1947 |